United States Patent
Sahim et al.

(10) Patent No.: US 7,515,907 B2
(45) Date of Patent: Apr. 7, 2009

(54) SYSTEMS AND METHODS FOR LOCATION IDENTIFICATION OF ENDPOINTS

(75) Inventors: Faramarz F. Sahim, Boca Raton, FL (US); Nibal T. Aziz, Lake Worth, FL (US); Bruce M. Skeldon, Wellington, FL (US); Peggy Marie Stumer, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 11/141,577

(22) Filed: May 31, 2005

(65) Prior Publication Data

US 2006/0270384 A1    Nov. 30, 2006

(51) Int. Cl.
*H04Q 7/20* (2006.01)
(52) U.S. Cl. .............. 455/435.1; 455/404.1; 455/521; 379/45; 370/389
(58) Field of Classification Search .............. 455/435.1, 455/404.1, 521, 435; 379/45; 370/389
See application file for complete search history.

(56) References Cited

U.S. PATENT DOCUMENTS

| | | | |
|---|---|---|---|
| 6,108,790 A * | 8/2000 | Moriya et al. ................ | 726/5 |
| 6,256,489 B1 | 7/2001 | Lichter et al. | |
| 6,727,973 B2 * | 4/2004 | Mizumo ...................... | 355/40 |
| 6,968,385 B1 * | 11/2005 | Gilbert ....................... | 709/229 |
| 7,079,837 B1 * | 7/2006 | Sherman et al. ............. | 455/415 |
| 7,108,177 B2 * | 9/2006 | Brookner .................... | 235/382 |
| 2002/0055351 A1 * | 5/2002 | Elsey et al. .................. | 455/414 |
| 2002/0101961 A1 | 8/2002 | Karnik et al. | |
| 2003/0063714 A1 | 4/2003 | Stumer et al. | |
| 2003/0074461 A1 * | 4/2003 | Kang et al. .................. | 709/230 |
| 2003/0211839 A1 * | 11/2003 | Baum et al. ................. | 455/403 |
| 2004/0038664 A1 * | 2/2004 | Stoks ....................... | 455/404.1 |
| 2004/0057425 A1 * | 3/2004 | Brouwer et al. ............. | 370/352 |
| 2004/0254757 A1 * | 12/2004 | Vitale et al. ................. | 702/122 |
| 2005/0063519 A1 | 3/2005 | James | |
| 2006/0013147 A1 * | 1/2006 | Terpstra et al. .............. | 370/252 |

OTHER PUBLICATIONS

Schulzrinne Columbia U B Rosen Marconi H: "Emergency Services for Internet Telephony Systems; draft—schulzrinne—sipping—emergency—arch—0 2.txt;" IETF Standard—Working—Draft, Engineering Task Force, IETF, CH, No. 2, Oct. 18, 2004, ISSN: 0000—0004.

* cited by examiner

*Primary Examiner*—Nghi H Ly

(57) ABSTRACT

Devices, systems and methods for transient endpoint location identification are disclosed. The exemplary method may include transmitting a registration request from an endpoint to a server. The server requests a location identification number from the endpoint. The server associates the address of the endpoint with the location identification number provided by the endpoint. When the endpoint contacts emergency personnel, the server provides the location identification number associated with the endpoint, allowing emergency personnel to locate the endpoint.

17 Claims, 5 Drawing Sheets

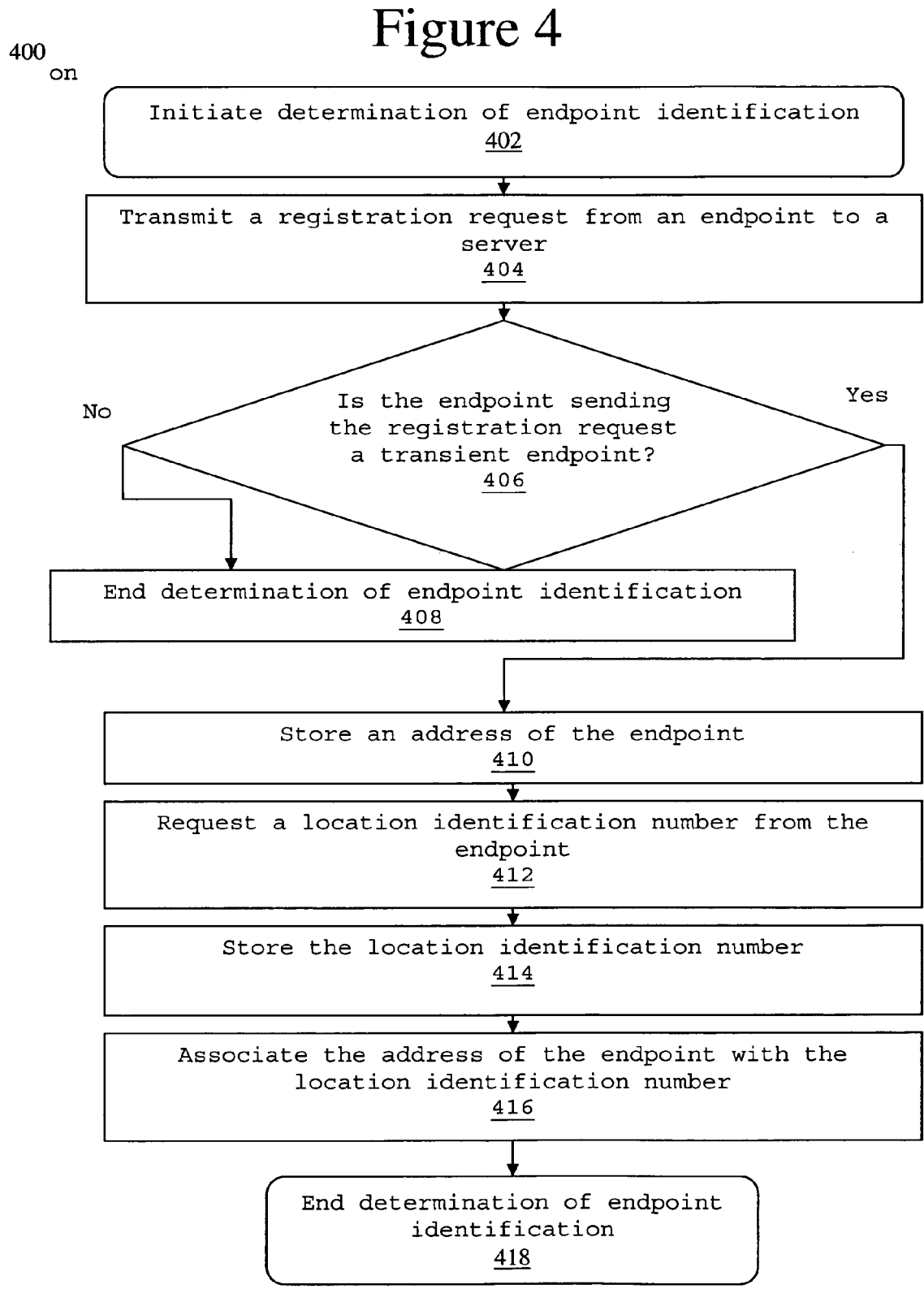

Initiate determination of
endpoint identification
502

↓

Transmit a registration request from an
endpoint to a server
504

↓

Store an address of the endpoint
506

↓

Provide a user with a list of location
identification numbers
508

↓

Request that the user select from the list
of location identification numbers or
enter a new location identification number
for the endpoint
510

↓

Store the location identification number
512

↓

Associate the address of the endpoint with
the location identification number
514

↓

End determination of endpoint
identification
516

SYSTEMS AND METHODS FOR LOCATION IDENTIFICATION OF ENDPOINTS

FIELD OF THE INVENTION

The present invention relates generally to location identification of endpoints on a communication network, and more particularly to providing endpoint location information to public safety answering points.

BACKGROUND OF THE INVENTION

When a user dials 911 on a traditional telephone network, emergency personnel receive not only the phone number of the telephone that placed the call but also the physical location of the phone and the billing address and name of the owner of the telephone. This information is obtained using the phone number as a Location Identification Number (LIN) which is used to search an Automatic Location Information (ALI) database. The database may be stored at the local telephone company and updated by the local telephone company. The ANI can also be used to route the call to the local Public Safety Answering Point (PSAP). The LIN routes the emergency call to the appropriate local emergency response team so that they identify and send the closest emergency personnel. The LIN allows emergency personnel to locate not only the emergency caller's location but also allows emergency personnel to return a call to the telephone that made the original emergency call. For example, if an individual in jeopardy drops the phone or loses the telephone connection, the LIN allows the emergency personnel to call the phone back to determine the current status of the situation or attempt to communicate emergency information to the individual.

While the current LIN system works well for traditional telephone systems, it does not work for transient endpoints on a Voice over Internet Protocol (VoIP) network. Endpoints on a VoIP network may send voice information in discrete digital packets using an internet protocol to a server that connects the VoIP to a traditional telephone. Many companies now use their local area networks (LANs) or wide area network (WAN) to transmit telephone signals between users on the network. One benefit of using a VoIP system to transmit telephone signals is the savings associated with not having to install and maintain a separate telephone system.

When a user dials 911 from an endpoint on a VoIP network, the server may associate an IP address or other identification of the endpoint with location information and identification information in a database of the server. When the server transmits the information to the local Public Safety Answering Point (PSAP), the server relays the location information and identification information to emergency personnel. However, if the endpoint is transient, the location information and identification information may not be correct if the endpoint is moved to different location.

Accordingly, an efficient and effective system and method is needed for providing location and identification information for transient endpoints. In view of the foregoing, it is desirable to provide a system and method that updates and stores location and identification information for endpoints.

SUMMARY OF THE INVENTION

It is, therefore, an objective of the present invention to provide devices, systems, and methods that update and store location and identification information for transient endpoints on a network.

According to an exemplary embodiment of the present invention, a method may include transmitting a registration request from an endpoint to a server. The server requests a location identification number from the endpoint and associates the address of the endpoint with the location identification number. The address of the endpoint may be an IP address. The endpoint and the server may use session initiation protocol.

In an additional aspect of the invention, the method may also include an endpoint transmitting an emergency number contact from an endpoint to the server. The server retrieves the location identification number associated with the address of the endpoint. The server also connects the endpoint to the emergency number contact and transmits the location identification number associated with the address of the endpoint to the emergency number.

In another embodiment, the server determines from the location identification number an appropriate public safety answering point to connect the endpoint. In another embodiment a user is provided with a list of location identification numbers associated with the user. In yet another embodiment the server determines if the endpoint sending the registration request is a transient endpoint.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which:

FIG. 4 is a flow chart illustrating a third exemplary embodiment of the present invention.

FIG. 5 is a flow chart illustrating a fourth exemplary embodiment of the present invention.

DETAILED DESCRIPTION OF THE INVENTION

Figure 1:
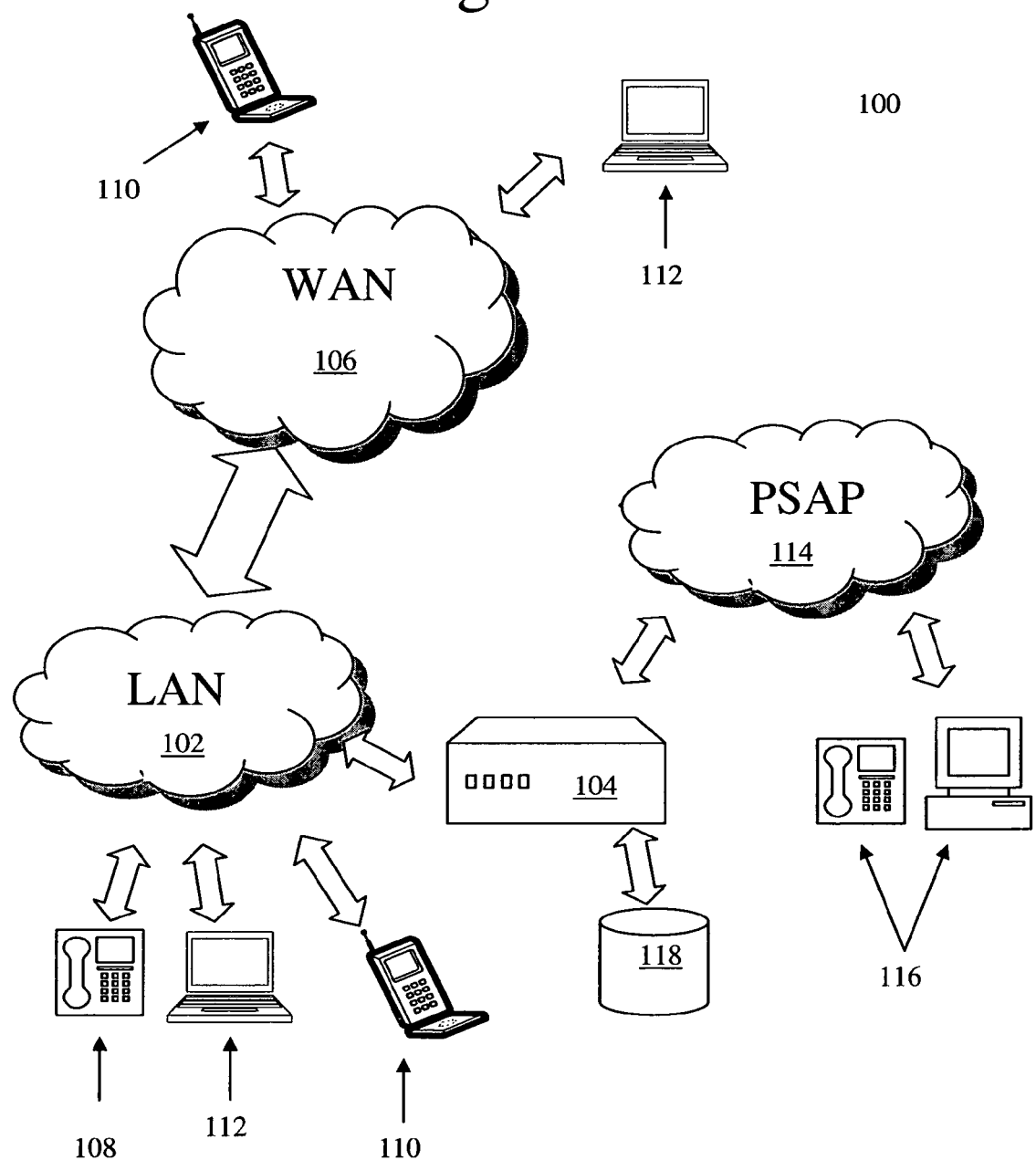
FIG. 1 shows a generalized schematic of an exemplary communications network used to implement a preferred embodiment of the present invention.

FIG. 1 is a generalized schematic of an exemplary telephone communications network 100 that may be used to implement preferred embodiments of the present invention. The communications network 100 connects various communication devices' endpoints through a Local Area Network (LAN) 102. The LAN 102 may include a variety of endpoint devices to allow a user to transmit and receive telephone signals to and from a server 104. The LAN 102 may also include additional equipment, for example, routers, hubs, workstations, and additional servers (not shown). The additional components can reformat and transmit the information using multiple protocols prior to delivering the information to the server 104. The digital packets can be transmitted across Wide Area Networks (WAN) 106 to other LANs (not shown) with similar endpoint devices. The endpoint devices may use a Wide Area Network (WAN) 106 to connect to the server 104 from remote locations.

The endpoint devices may be the OptiPoint® family of VoIP telephones manufactured by Siemens or any other suitable VoIP telephone 108. These phones transmit and receive audio signals over the LAN 102 to the server 104. The endpoint device may also be a mobile phone 110. The mobile phone 110 may connect to the server 104 from a local location within the LAN 102 or may connect to the server 104 from a remote location on the WAN 106. The mobile phone 110 may also use a wireless network to connect to the WAN 106. In addition to a mobile phone 110, the endpoint may be a Personal Data Assistant (PDA) or mobile computer 112. The endpoint devices establish a connection to the server. The server may identify the endpoint using the endpoint's IP address. The server 104 also provides a connection to a public branch exchange (not shown). This allows the endpoint devices to connect to telephones on a traditional telephone network. The server 104 may also provide a connection to a Public Safety Answering Point (PSAP) 114. This allows the endpoint devices to connect to an emergency personnel station 116. The server 104 may connect to the PSAP 114 directly or it may connect to the PSAP 114 through the traditional telephone network.

When an endpoint calls an emergency number, the call is routed to the server 104. The server 104 connects the call to the PSAP 114. In order to provide emergency information to the emergency personnel station 116, the server 104 stores the emergency information in a local database 118 coupled to the server 104. The emergency information may include the location of the endpoint and the information for contacting the endpoint, the server 104 relays this information to the PSAP 114 when the endpoint calls emergency personnel. The server 104 maintains and updates the emergency information associated with each endpoint. The server 104 may maintain and update the emergency information according to the exemplary methods described herein.

Figure 2:
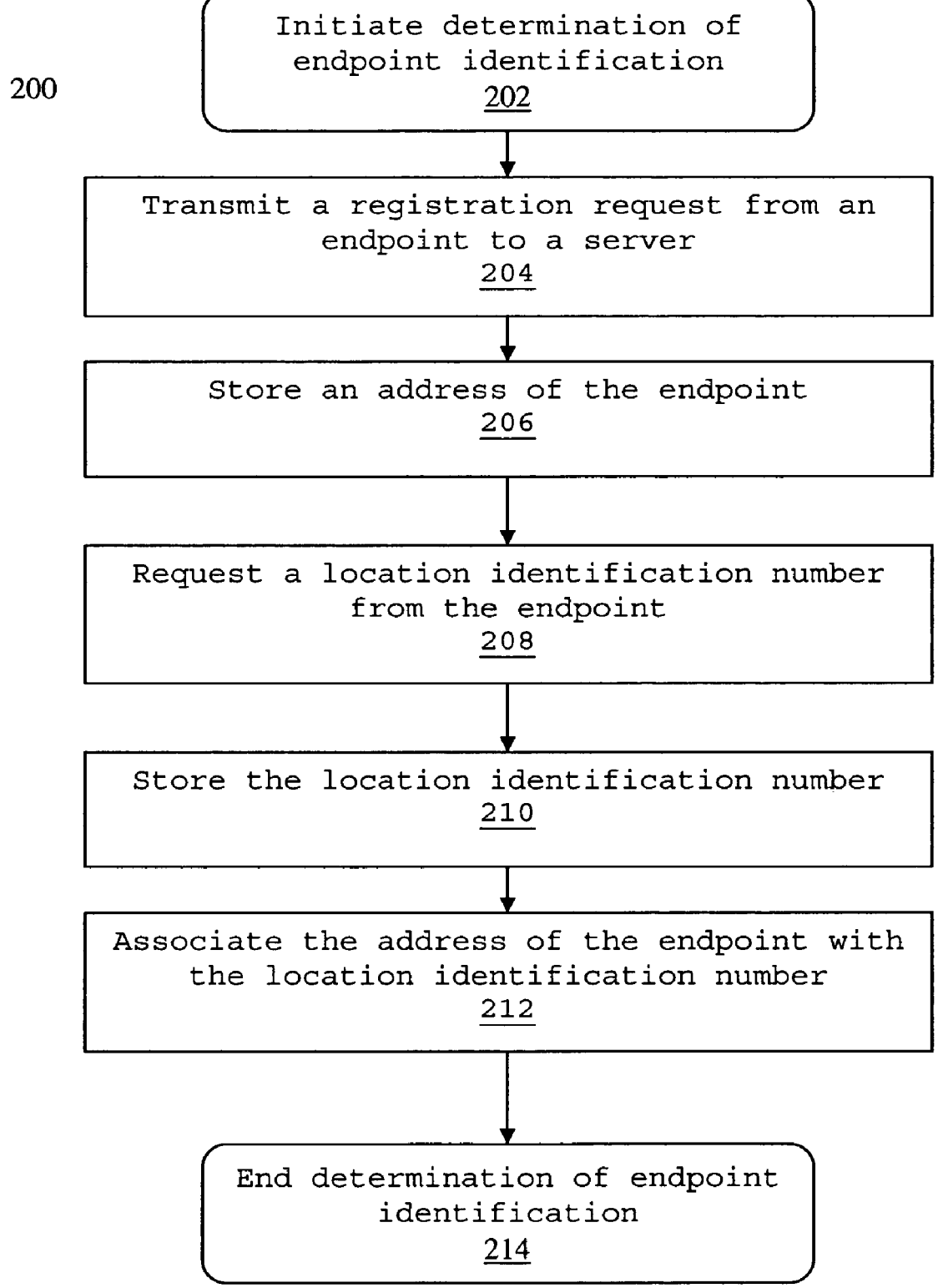
FIG. 2 is a flow chart illustrating a first exemplary embodiment of the present invention.

FIG. 2 is a flow chart illustrating a first exemplary embodiment 200 of the present invention. According to the first exemplary embodiment 200, the server 104, an endpoint user, or an administrator initiates determination of endpoint identification (block 202). The determination of endpoint identification may be initiated by a maintenance routine that is periodically executed by the server 104. The process may also be initiated when an endpoint requests a connection to a server 104. In another exemplary aspect, the process may be initiated when the server 104 detects a change in the endpoint's location. For example, the server 104 may recognize that the endpoint is no longer connected within the LAN 102 and is now connected via the WAN 106. In another example, the server may recognize that the local IP address has changed and that no new Location Identification Number (LIN) has been entered for the new local IP address. In this example, the server avoids burdening the user with unnecessary updates if the LIN has not changed or has already been submitted. The above examples for initiating the process are exemplary methods. The process for initiating the endpoint identification is not limited to these exemplary processes. A variety of other processes should be apparent to an individual skilled in the art.

Once the process is initiated, the endpoint may transmit a registration request to the server 104 (block 204). The server 104 stores an address of the endpoint (block 206). The address of the endpoint may be an IP address of the endpoint or other identifiable address used by the server 104 to identify the endpoint. The server 104 requests a (LIN) from the endpoint (block 208). The request may be initiated after the registration is complete. The server may place a call to the user to initiate the collection of an LIN. The request may be in the form of an audio prompt to the user or as text message to the endpoint. The user of the endpoint may enter an LIN into the endpoint and transmit the LIN to the server 104. The user may enter the LIN via a keypad coupled to the endpoint using touch tone entry or may also enter the LIN audibly. The server 104 or endpoint may use voice recognition to determine the audibly entered LIN. The voice recognition may be performed by the server 104 or by an additional media server controlled by the server 104. The server 104 stores the LIN for later user (block 210). The server 104 may store the LIN in the local database 118 or other memory associated with the server 104. The server 104 associates the endpoint's address with the stored LIN (block 212). The determination of endpoint identification is complete and the server 104 waits to update until the next LIN update or until the endpoint contacts emergency personnel (block 214).

Figure 3:
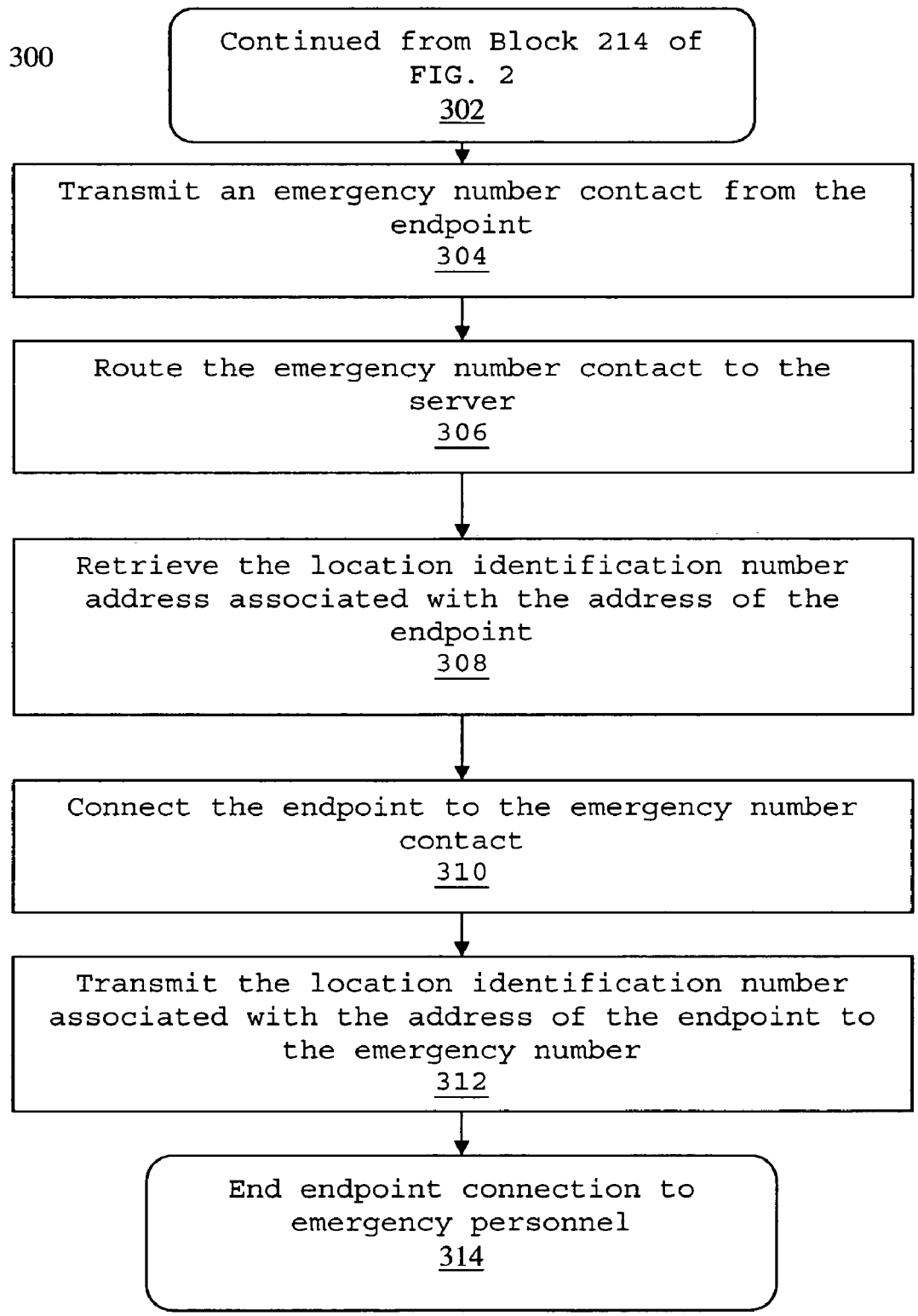
FIG. 3 is a flow chart illustrating a second exemplary embodiment of the present invention.

FIG. 3 is a flow chart illustrating a second exemplary embodiment 300 of the present invention. According to the second exemplary embodiment 300, the system determines the LIN of the endpoint (block 302). The endpoint transmits an emergency number contact to the server 104 (block 304). The emergency number contact is routed to the server 104 (block 306). The server 104 retrieves the LIN associated with the address of the endpoint transmitting the emergency number contact (block 308). The server 104 connects the endpoint to the emergency number contact (block 310). The server 104 also transmits the LIN associated with the address of the endpoint to the emergency number (block 312). This allows the emergency personnel to identify the location of the individual contacting the emergency personnel. The emergency personnel also have a contact number that can be used to contact the user in case the connection between the user and emergency personnel is lost. The process for connecting the endpoint connection to emergency personnel is completed (block 314).

FIG. 4 is a flow chart illustrating a third exemplary embodiment 400 of the present invention. According to the third exemplary embodiment 400, the invention determines if the endpoint requires update of the LIN. The server 104, an endpoint user, or an administrator initiates determination of endpoint identification as previously discussed with regard to the first exemplary embodiment (block 402). Once the process is initiated, the endpoint may transmit a registration request to the server 104 (block 404).

The server 104 determines if the endpoint sending the registration request is a transient endpoint (block 406). If the endpoint sending the registration request is not a transient endpoint ("No" branch of block 406), the server 104 may ignore the endpoint identification process (block 408). The endpoint may be a stationary endpoint and have prior identification stored and the server 104 may not need to update the identification information. Therefore, the server 104 does not continue with the identification process. In another aspect of the third embodiment, the identification process may continue only for a registration request sent during a first setup registration request of the stationary endpoint. This will allow the server 104 to store identification information for the stationary endpoint during setup and not expend time determining identification information when the stationary endpoint has not changed locations.

If the endpoint sending the registration request is a transient endpoint ("Yes" branch of block 406), the server 104 may continue with the endpoint identification process. The server 104 stores an address of the endpoint (block 410). Similar to the first exemplary embodiment, the address of the endpoint may be an IP address of the endpoint or other identifiable address used by the server 104 to identify the transient endpoint. The server 104 requests a location identification number (LIN) from the endpoint (block 412). The request may be conducted in a variety of ways, as previously discussed in the first exemplary embodiment. The server 104 stores the LIN for later use (block 414). The server 104 may store the LIN in the local database 118 or other memory associated with the server 104. The server 104 associates the endpoint's address with the stored LIN (block 416). The determination of endpoint identification is complete and the server 104 waits to update until the next LIN update or until the endpoint contacts emergency personnel (block 418).

FIG. 5 is a flow chart illustrating a fourth exemplary embodiment of the present invention. According to the fourth exemplary embodiment 500, the invention provides the user of the endpoint with a list of possible LINs. The server 104, an endpoint user, or an administrator initiates determination of endpoint identification as previously discussed with regard to the first exemplary embodiment (block 502). Once the process is initiated, the endpoint may transmit a registration request to a server 104 (block 504). The server 104 stores an address of the endpoint (block 506). Similar to the first exemplary embodiment, the address of the endpoint may be an IP address of the endpoint or other identifiable address used by the server 104 to identify the transient endpoint. The server 104 provides the user with a list of LINs (block 508). The server 104 may provide the list of LINs using an audio prompt.

The list of LINs may be a compilation of LINs previously used by the user. The list may also be LINs entered by an administrator or a nearby public LIN, and may include locations frequently used by the user. For example, the list may include an LIN associated with the user's work office, an LIN associated with the user's home office, or an LIN associated with a client of the user. The server 104 requests that the user select from the list of LINs (block 510). The user may also enter a new LIN for the endpoint if none of the LINs on the list are correct. The list of LINs and the user's selection may be communicated audibly or with a display and keypad. The server 104 stores the LIN for later user (block 512). The server 104 may store the LIN in the local database 118 or other memory associated with the server 104. The server 104 associates the endpoint's address with the stored LIN (block 514). The determination of endpoint identification is complete and the server 104 waits to update until the next LIN update or until the endpoint contacts emergency personnel (block 516).

Architecturally, aspects of the invention can be located on a server, workstation, minicomputer, mainframe, or any other suitable platform. Aspects of the invention may also be located on an endpoint device of the network, for example a primary telephone of the network may be configured to perform the methods associated with the invention.

A general purpose computer, in terms of hardware architecture, includes a processor, memory, and one or more input and/or output (I/O) devices (or peripherals) that are communicatively coupled via a local interface. The local interface can be, for example, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the components of a network. The systems and methods may be hardwired or wirelessly connected with the computer or other suitable device to perform various aspects of the invention.

The systems and methods may also be incorporated in software used with a computer or other suitable operating device. The software stored or loaded in the memory may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services.

The system and method may also include a Graphic User Interface (GUI) to allow the administrator or user to enter constraints associated with determining the LIN of endpoints. The GUI may provide a user-friendly interface which allows the administrator or user to enter or select LINs.

It will be understood that the foregoing is only illustrative of the principles of the invention and that various modifications can be made by those skilled in the art without departing from the scope and spirit of the invention. Accordingly, such embodiments will be recognized as within the scope of the present invention.

Persons skilled in the art will appreciate that the present invention can be practiced by other than the described embodiments, which are presented for purposes of illustration rather than of limitation and that the present invention is limited only by the claims that follow.

What is claimed is:

1. A method for endpoint location and identification comprising:
   receiving a registration request from an endpoint to a server;
   determining whether the endpoint sending the registration request is a transient endpoint, said transient endpoint being at least one of a VoIP telephone or mobile phone;
   storing an address of the endpoint;
   requesting a location identification number from the endpoint;
   receiving the location identification number, said location identification number being received through at least one of keypad input from said endpoint or voice recognition;
   storing the location identification number;
   associating the address of the endpoint with the location identification number; and
   detecting a change in a location of said endpoint, said detecting said change in said location including at least one of recognizing that said endpoint is no longer connected within a local area network and is connected across a wide area network or recognizing that a local internet protocol address has changed and a new location identification number has not been entered for the local internet protocol address.

2. The method of claim 1, further comprising:
   receiving an emergency number contact from the endpoint;
   routing the emergency number contact to the server;
   retrieving the location identification number address associated with the address of the endpoint;
   connecting the endpoint to the emergency number contact; and
   transmitting the location identification number associated with the address of the endpoint to the emergency number contact.

3. The method of claim 2, further comprising:
   determining from the location identification number an appropriate public safety answering point to connect the endpoint.

4. The method of claim 1, wherein the address of the endpoint is an IP address.

5. The method of claim 1, further comprising:
providing a user with a list of location identification numbers associated with the user.

6. The method of claim 1, wherein the endpoint and server use session initiation protocol.

7. A system for endpoint location identification comprising:
a module for receiving a registration request from an endpoint to a server;
a module for determining if the endpoint sending the registration request is a transient endpoint, said transient endpoint being at least one of a VoIP telephone or mobile phone;
a module for requesting a location identification number from the endpoint;
a module for receiving the location identification number, said location identification number being received through at least one of keypad input from said endpoint or voice recognition;
a database for storing an address of the endpoint and the location identification number; and
a module for detecting a change in a location of said endpoint, said module for detecting said change in location including at least one of a module for recognizing that said endpoint is no longer connected within a local area network and is connected across a wide area network or a module for recognizing that a local internet protocol address has changed and a new location identification number has not been entered for the local internet protocol address.

8. The system of claim 7, further comprising:
a module for receiving an emergency number contact from the endpoint to the server;
a module for retrieving the location identification number from the database;
a module for connecting the endpoint to the emergency number contact; and
a module for transmitting the location identification number associated with the address of the endpoint to the emergency number contact.

9. The system of claim 7, further comprising:
a module for determining from the location identification number an appropriate public safety answering point to connect the endpoint.

10. The system of claim 7, wherein the address of the endpoint is an IP address.

11. The system of claim 7, further comprising:
a module for providing a user with a list of location identification numbers associated with the user.

12. The system of claim 7, wherein the endpoint and the server use session initiation protocol.

13. A system for location identification comprising:
a means for receiving a registration request from a means for communicating to a server;
a means for determining if the means for communication sending the registration request is a transient means for communication, said transient endpoint being at least one of a VoIP telephone or mobile phone;
a means for requesting a location identification number from the means for communication;
means for receiving the location identification number, said location identification number being received through at least one of keypad input from said endpoint or voice recognition;
a means for storing an address of the means for communication and the location identification number in a database; and
a means for detecting a change in a location of said endpoint, said means for detecting said change in location including at least one of means for recognizing that said endpoint is no longer connected within a local area network and is connected across a wide area network or means for recognizing that a local internet protocol address has changed and a new location identification number has not been entered for the local internet protocol address.

14. The system of claim 13, further comprising:
a means for receiving an emergency number contact from the means for communicating to the server;
a means for retrieving the location identification number from the database;
a means for connecting the means for communication to the emergency number contact; and a means for transmitting the location identification number associated with the address of the means for communication to the emergency number contact.

15. The system of claim 13, further comprising:
a means for determining from the location identification number an appropriate public safety answering point to connect the means for communication.

16. The system of claim 13, wherein the address of the means for communication is an IP address.

17. The system of claim 13, further comprising: a means for providing a user with a list of location identification numbers associated with the user.

* * * * *